Nov. 26, 1968   R. R. TURK   3,413,393
FABRICATION OF CONTROLLED-POROSITY METALS
Filed April 28, 1965   4 Sheets-Sheet 1

INVENTOR.
ROGER R. TURK,
BY John M. Koch
ATTORNEY.

United States Patent Office 3,413,393
Patented Nov. 26, 1968

3,413,393
FABRICATION OF CONTROLLED-POROSITY METALS
Roger R. Turk, Woodland Hills, Calif., assignor to Hughes Aircraft Company, Culver City, Calif., a corporation of Delaware
Filed Apr. 28, 1965, Ser. No. 451,596
2 Claims. (Cl. 264—111)

ABSTRACT OF THE DISCLOSURE

This disclosure provides for compact metal bodies of predetermined controlled porosity prepared from metal powders and an improved method of compacting same, sintering, machining and finishing to provide the desired porosity.

---

This invention relates to metals of controlled porosity, particularly refractory metals of closely controlled and predictable porosity, and especially high pore density tungsten made of particles of narrow size range.

The invention described herein was made in the performance of work under a NASA contract and is subject to the provisions of Sec. 305 of the National Aeronautics and Space Act of 1958, Public Law 85–568 (72 Stat. 435; 42 U.S.C. 2457).

In prior art powder metallurgy of metals in general, and of refractory metals including tungsten in particular, it is required that the metal powder exhibit high strength in the pressed condition to facilitate production of parts, along with a rapid sintering rate to close all pores and obtain highest possible densities. Metal powder requirements which meet these two objectives include a wide range of particle size, non-uniform particle shape and high interparticle friction. These characteristics are in direct opposition to those required for the production of uniform, stable, porous metal bodies where close-packing of uniform shapes, minimum contact areas and stable pore interconnection after sintering are desired.

An object of this invention is to provide a method for producing uniform, stable, porous metal bodies such as tungsten bodies of high pore density.

Additional objects of this invention will become apparent from the following description, which is given primarily for purposes of illustration, and not limitation.

Stated in general terms, the objects of the invention are attained by producing porous refractory metals, such as porous tungsten, by producing metal powder, spheroidizing the metal powder, separating the spherical particles into narrow size ranges, cleaning the spherical particles, filling a die with the cleaned particles, warm pressing the particles to obtain a compact of high pressed strength, thermally expanding the die during release of pressing pressure to compensate for elastic springback of the die, thermally expanding the die following pressure release to remove the die from the compact and punches, and subjecting the resulting compact to vacuum sintering and finishing operations to produce the desired porous metal article.

A more detailed description of a specific embodiment of the invention, as applied to producing a porous tungsten ionizer, is given below with reference to the accompanying drawings, wherein.

Tungsten powder is made by reduction, such as hydrogen reduction of one of the tungsten compounds resulting from chemical purification of the ore such as tungstic oxide, ammonium paratungstate, sodium tungstate or tungstic acid.

The tungsten metal powder is then crushed by ball milling to yield unagglomerated particles of small size.

The unagglomerated, fine tungsten powder thus produced is spheroidized as indicated at 10 by melting the particles in a plasma flame, for example, to produce spheres in the range from about 1 to about 7 microns diameter. Other spheroidizing methods known in the art can be used.

The resulting spherical particles are separated into narrow size ranges by suitable classification operations, as indicated at 11, to produce narrow size ranges at about 2.4 microns, about 3.3 microns, about 3.9 microns, about 4.2 microns, about 5.3 microns and about 6.9 microns. A classifier utilizing a combination of centrifugal force and counter current air elutriation has been used successfully, as has water elutriation.

Suitable measurement and control of size, size distribution and standard deviation is accomplished by the use of 2000× photomicrographs of representative, level layers of each powder size fraction. Such spherical particles, being unagglomerated, can be separated into narrow size range fractions wherein the particles are of uniform spherical shape, offering minimum clean surface area for frictional contact, and completely fulfilling the requirements for the production of controlled-porosity material.

The narrow size range fractions of spherical tungsten particles are cleaned by chemical washing with solutions of sodium hydroxide and hydrogen fluoride to remove oxides from the surfaces of the spheres, as indicated at 12. This improves the flow properties by reducing interparticle friction and permits close packing of the spherical particles. Close packing of uniform spheres to the maximum of about 74.05% of theoretical density will, upon sintering to a desired density of about 80% of theoretical, produce interconnected pores of a uniform size and spacing dependent upon the original sphere size. All operations following cleaning and prior to sintering are performed in a protective atmosphere of inert gas such as argon.

Figure 1:
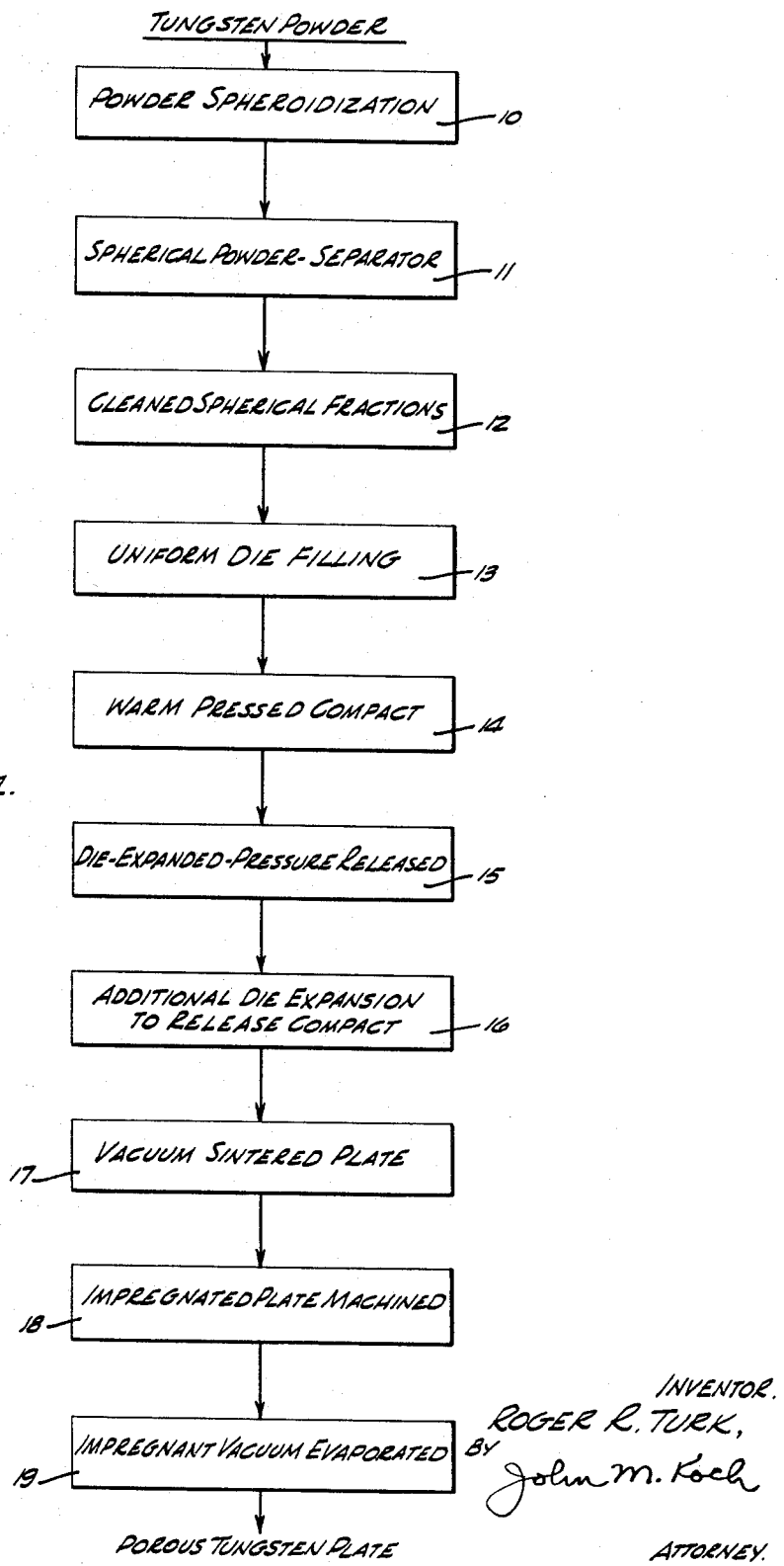
FIG. 1 is a flow sheet schematically showing the steps of a specific embodiment of the method of the invention.
Figure 2:
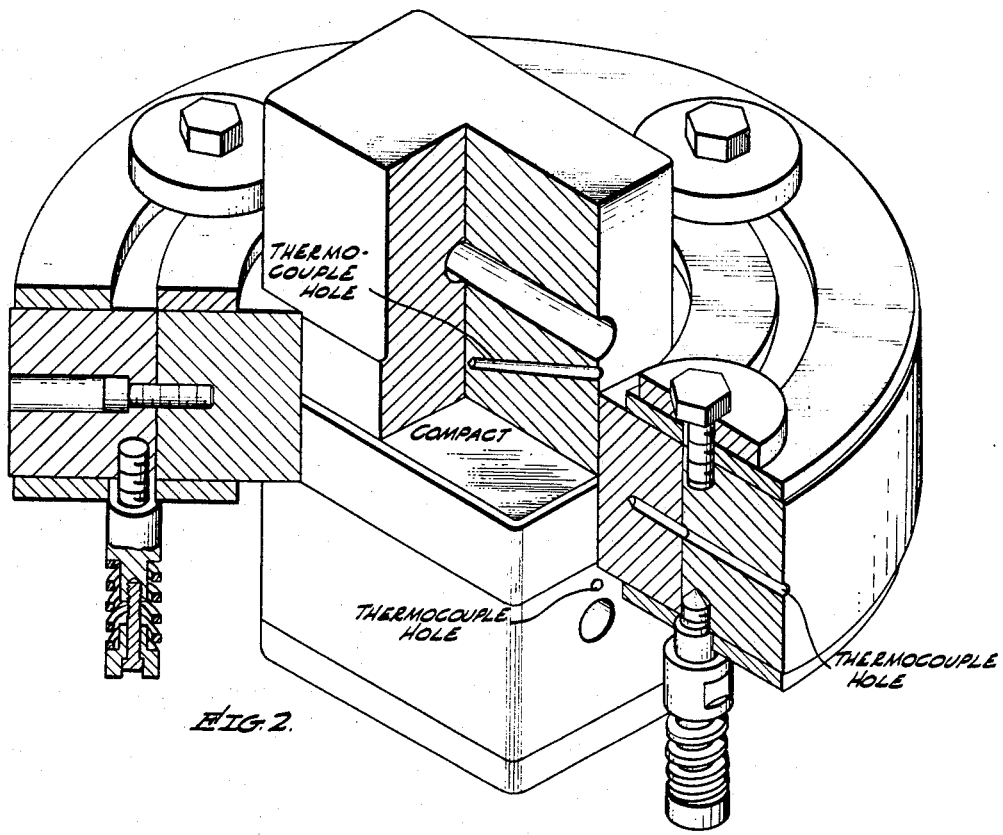
FIG. 2 is an isometric view with portions cut away showing a plate pressing die used in accordance with the invention.
Figure 3:
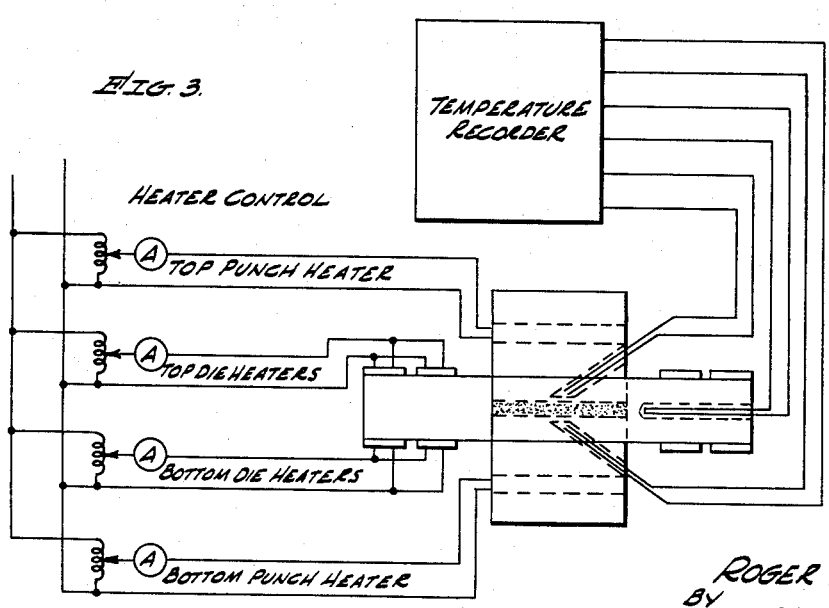
FIG. 3 is a schematic diagram showing electrical controls and temperature monitoring means used with the die for hot-pressing spherical tungsten powder.

A narrow size range of or fraction of spherical particles, prepared as described above, is carefully filled, in an inert atmosphere chamber, into a suitable die, such as a die for preparing a porous plate, to insure uniform powder distribution prior to pressing the powder into a plate compact, as indicated at 13. Uniform dispersion of powder is obtained by placing measured equal quantities of powder at uniformly spaced positions over the die surface, using a removable lattice as a guide. A tungsten wire comb is finally used to produce uniform density throughout the powder fill. The die and punches used for pressing this powder should have clearances of the order of the powder size, to prevent excessive trapping of powder between punches and die sidewalls. Since powder size is in the range of 5 microns, or 0.0002″, die tolerances should be extremely close, usually within 0.0002″ to 0.0004″ maximum overall clearance in either length or width. In addition, these tolerances should be maintained during heating to 260° C. during which the total longitudinal die expansion is over 0.010″. This requires close control of temperature of both die body and punches by means of the heaters and thermocouple holes shown in FIG. 2 and heating controls shown in FIG. 3. Temperature differences should be kept within 4° C., so that tolerance changes will be less than 0.0002″. The 12% chromium die steel used has a linear coefficient of expansion of $10.6 \times 10^{-6}$ inches per inch per ° C.

Figure 4:
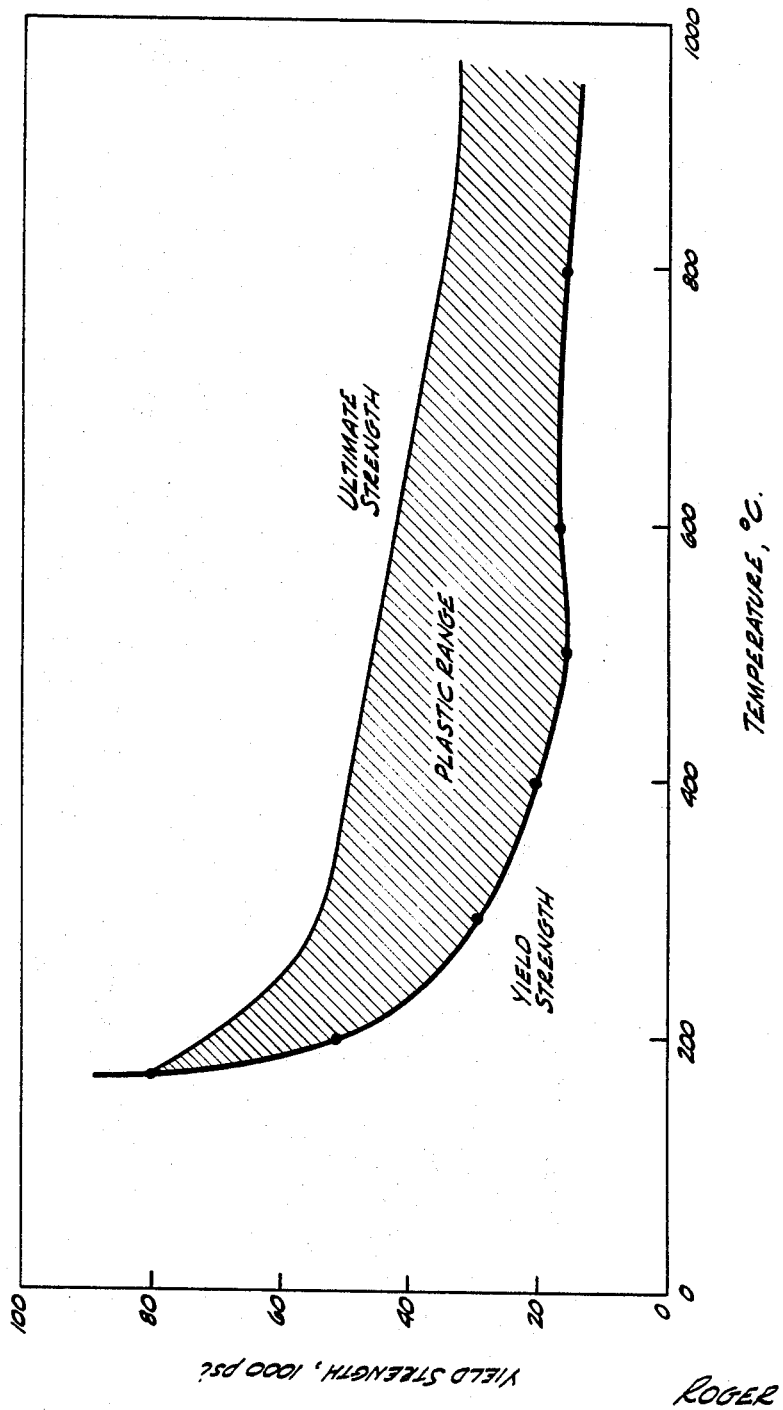
FIG. 4 is a graph showing the relationship between the strength of tungsten and the temperature of pressing.

The powder in the filled die then is subjected to warm pressing at about 260° C. for about 30 minutes dwell time at about 75,000 p.s.i. to obtain high strength in the pressed compact, as noted at 14. All heating and pressing is performed under inert atmosphere, to protect against oxidation. The method of warm pressing to obtain high pressed strength was chosen after consideration of two more common methods, binder addition and mixture of powder sizes. Complete removal of a volatile binder from a fine structural body is not believed feasible and mixing varying powder sizes would defeat the ability to control and predict pore size, uniformity and spacing. Warm pressing in the range of 150° to 400° C. permits partial flattening of spheres at point of contact without breakage, since a lowered yield strength and high breaking strength give a wide plastic working range over these temperatures, as shown in FIG. 4. The slight flattening of the spheres at their contact points gives high pressed strength. Pressed strength and density is almost independent of temperatures between 250° and 400° C., and dwell time between 15 and 60 minutes at pressure. Coarser powders of 5 microns and larger may be pressed at temperatures as low as 150° C., while finer materials of 2 to 3 microns need at least 250° C. for good pressed strength. However, pressed density (and strength) is a direct function of pressure and particle size. Higher pressures yield higher densities, with 0.7 percent density increase for an increase in pressure of 5,000 p.s.i. Larger particle sizes yield higher densities than do finer sizes at the same pressure, with 0.7 percent density increase for an increase in particle diameter of 2 microns. To obtain a density of 74% of theoretical, the following pressures are recommended for various particle sizes: 78,000 p.s.i. for 2.4 micron; 75,000 p.s.i. for 3.9 micron; 71,000 p.s.i. for 5.3 micron; and 65,000 p.s.i. for 6.9 micron.

After the strong powder compact is thus produced, the compact is released carefully from the die. While under pressure of 75,000 p.s.i., the steel die expands elastically about 0.004″ in the long direction and about 0.002″ in the short direction. The compacted powder is pressed to this full expanded size. Rapid release of pressure results in elastic contraction of the die, breaking the brittle compact. By careful thermal expansion of the die while the pressure upon the compact and die is being released, the die cavity is maintained at constant size to prevent any cracking of the brittle metal powder compact, as indicated at 15. In the case of a die steel containing 12% chromium, a rate of about 4° C. temperature rise is employed for about 4,000 p.s.i. pressure release. This corresponds to a change in die condition from 260° C. at 75,000 p.s.i. to 335° C. at 0 p.s.i.

Upon complete release of punch pressure with compensating thermal expansion of the die, the die is additionally expanded thermally, as indicated at 16, to expand the die away from the tungsten powder compact and the punches to carefully release the brittle compact from the die without the formation of ejection strains, or undue wall friction. For tungsten plate compacts in a 12% chromium steel die, an additional temperature rise of the die body of about 80° C. above that of the punches and the compact has been found to be satisfactory. This corresponds to a final change in die temperature from 335° C. to 415° C. Following final expansion of the die, the bottom press platen, supporting the punches and compact, is lowered away from the die body, which is suspended from the top platen. The top punch separates from the compact after emergence from the die body, being suspended from the hanging die body. Compact and all tooling are permitted to cool to room temperature under protective atmosphere before exposure to air.

Figure 5:
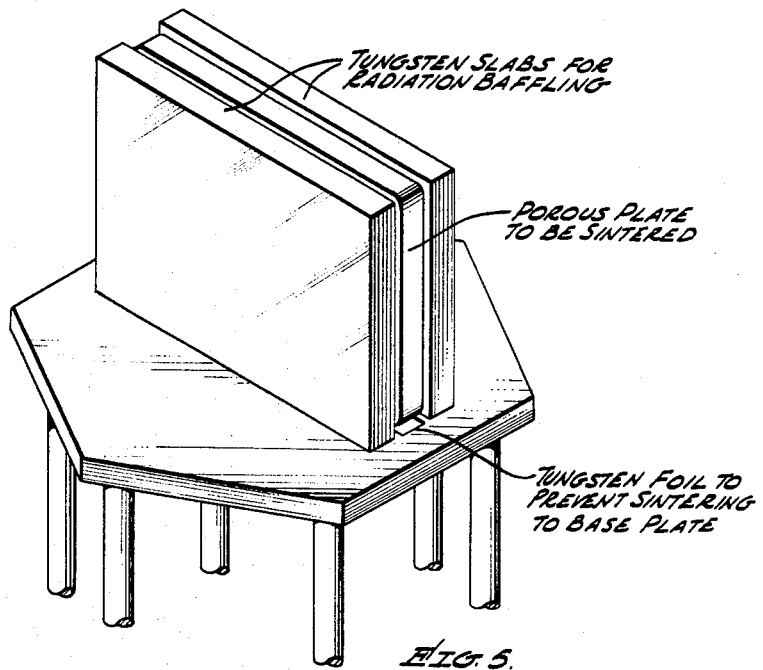
FIG. 5 is an isometric view showing apparatus used for sintering porous tungsten plates in a vacuum furnace.

The resulting plate compact is vacuum sintered while resting on its edge as shown in FIG. 5 to avoid density non-uniformities produced by any adherence of the compact to the base plate of the sintering apparatus during shrinkage of the compact in the sintering vacuum of about $10^{-6}$ torr, at about 1900° C. for about 60 minutes. Satisfactory results were obtained by thus vacuum sintering tungsten powder plate compacts on one edge on the tungsten plate, as indicated at 17, to minimize base-plate adherence. Sintering time and temperature are dependent upon particle size, with finer sizes requiring lower temperatures and shorter times than larger sizes to attain the same sintered density. For example, 3.9 micron powder, compacted to 74% of theoretical density, requires 60 minutes at 1700° C. to reach a density of 80%, 6.9 micron powder at 74% density, requires 180 minutes at 1900° C. to reach a density of 80%.

Figure 6:
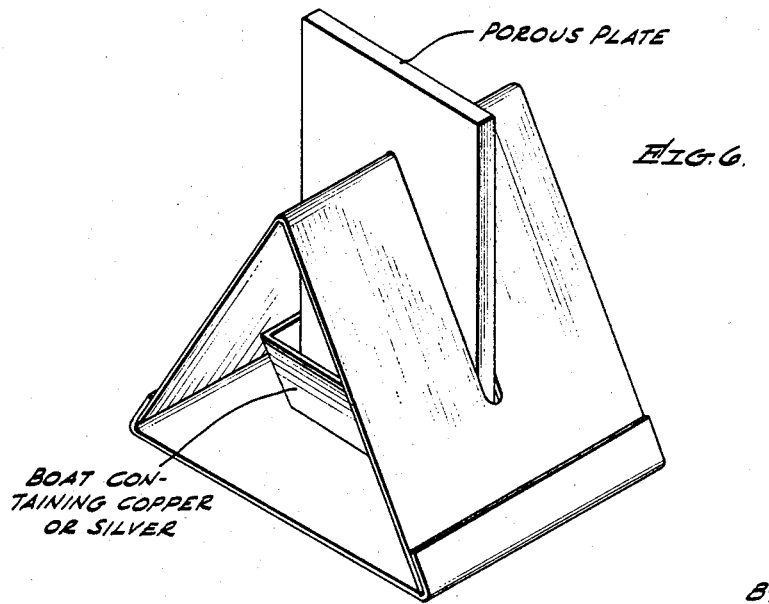
FIG. 6 is a similar view showing apparatus used for absorption of copper into the tungsten plate.

A sintered plate thus produced is prepared for machining. This is accomplished by impregnating the sintered porous tungsten plate with liquid copper or silver by capillary action, as shown in FIG. 6, at about 1225° C. for about 5 minutes from the bottom of the plate up to the top in a hydrogen atmosphere, said impregnation occurs following the sintering step 17 prior to the machining step as indicated at 18. As shown in FIG. 6, copper impregnant is fed from a short edge of the plate, so that excess copper or silver, on cooling, contacts only a limited area of the plate. This prevents breaking or warping of the plate due to contraction of the cooling solid copper or silver, which is greater than thermal contraction of the tungsten. The copper filling permits machining the porous plate without closing the pores of the tungsten which otherwise would be smeared shut by the machine tool. It also prevents internal contamination by machining lubricants.

After machining, the impregnating copper or silver is vacuum evaporated from the porous plate at about 1650° C. and about $10^{-6}$ torr to produce the desired porous tungsten plate, as indicated at 19. The resulting plate is clean and free of binding agents, of uniform high pore density, with predictable porosity.

Relatively thin plates of porous tungsten of predictable porosity have been made by the use of the method of the invention. These plates were 4.25 inches long, 2.5 inches wide and 0.125 inch thick. The plates showed high pressed strength due to the warm pressing operation indicated at 14. Sintered structures of this type have been found to be suitable for use in ionizers in cesium ion engine applications where the extremely uniform distribution of pores and high pore density results in a high efficiency of ionization of cesium atoms.

It will be understood that although the method of the invention has been described in detail above as applied to the production of porous tungsten plates, the invention, with modifications apparent to a person skilled in the art can be applied to methods for the production of refractory metal plates such as molybdenum, uranium, titanium, vanadium, tantalum, and the like.

For example, exemplary plates formed of spherical tungsten powders of a size of 2.4 microns to 6.9 microns have been prepared by the process of this invention, with a sintered porosity of 80% density. Thus, providing examples of such refractory metal compacts, as indicated, made from metal powders that may be of a size range of about 1 micron to about 10 microns compacted, by the method as herein disclosed, in a pressure range of from about 60,000 to about 90,000 p.s.i., to provide compact forms of a controlled porosity, as described.

Obviously many other modifications and variations of the present invention are possible in the light of the above teachings. It is therefore to be understood that within the scope of the appended claims the invention can be practiced otherwise than as specifically described.

What is claimed is:
1. A method for the production of uniform, stable, porous, compact metal bodies of predictable pore density comprising the steps of:
  (1) Filling a die body with a measured quantity of refractory metal particles of a size range on the order of about 1 micron to about 10 microns;
  (2) Inserting a punch within said die and heating said die and punch under closely controlled temperatures;
  (3) Pressing the metal particles by said die and punch in a temperature range of about 150° to about 400° C. in an inert atmosphere, the force of said pressing causing the walls of said die to elastically expand in two directions and said metal particles to fill the expanded portion of the die with a compact formed of said particles;
  (4) Gradually releasing the punch force on the compact while simultaneously increasing the temperature of the die to thermally expand the die walls and thereby provide a constant size relationship between the expanded die walls and the formed compact as the punch force is fully relieved;
  (5) Increasing the temperature of the die still further to thermally expand the die walls beyond the size of the formed compact and thereby provide a clearance between the die walls and the compact to avoid imposing strains on the compact during its ejection from the die, and
  (6) Withdrawing the punch and ejecting from the die a porous compact of said metal particles.

2. The method of claim 1 wherein the temperature difference of the die body and the punch means during pressing is not more than 4° C. and the compacting pressure is in the range of from about 60,000 to about 90,000 p.s.i.

References Cited

UNITED STATES PATENTS

| | | | |
|---|---|---|---|
| 1,305,975 | 6/1919 | Pfanstiehl | 72—214 |
| 3,051,566 | 8/1962 | Schwartz | 264—111 |

FOREIGN PATENTS

| | | |
|---|---|---|
| 575,478 | 3/1942 | Great Britain. |

ROBERT F. WHITE, *Primary Examiner.*

J. R. HALL, *Assistant Examiner.*